(No Model.)
J. L. HEALD.
DEVICE FOR SEPARATING ALMONDS FROM THEIR HULLS.
No. 372,146. Patented Oct. 25, 1887.
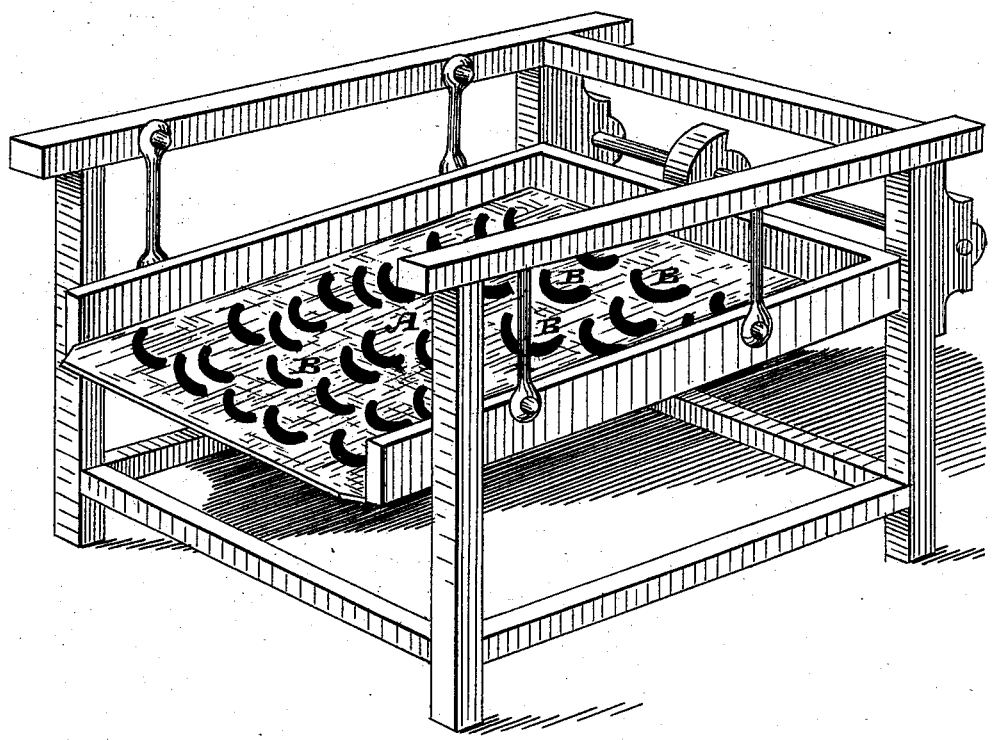
Witnesses,
Geo. H. Strong.
Inventor,
John L. Heald
Dewey & Co.
atty

UNITED STATES PATENT OFFICE.

JOHN L. HEALD, OF CROCKETT, CALIFORNIA.

DEVICE FOR SEPARATING ALMONDS FROM THEIR HULLS.

SPECIFICATION forming part of Letters Patent No. 372,146, dated October 25, 1887.

Application filed July 8, 1886. Serial No. 207,509. (No model.)

*To all whom it may concern:*

Be it known that I, JOHN L. HEALD, of Crockett, Contra Costa county, State of California, have invented an Improvement in Devices for Separating Almonds from their Hulls; and I hereby declare the following to be a full, clear, and exact description of the same.

My invention relates to a device for separating the loose hulls from almonds or similar nuts which are mixed together after the hulls have been stripped from the nuts; and it consists of a table having peculiarly shaped openings or perforations, which is given a shaking motion, so that the nuts and hulls pass over its surface, and during their passage the hulls are discharged through the openings, while the nuts will pass off separate from them.

Referring to the accompanying drawing for a more complete explanation of my invention, the figure is a perspective view of my device.

Almonds and similar nuts are separated from the outside hulls or coverings by various machines; but these machines leave the almonds and the hulls all mixed together, and the operation of separating them has hitherto been very tedious, as it has necessarily to be done by hand.

In my invention, A is a table, which may be made of any suitable material, and has slots B cut through it at intervals extending over its length and width. These slots are curved at their outer and inner sides and are of such shape that the semi-globular or half-oval shape of the hulls will cause them to slip through edgewise; but their diameters are so narrow that the smallest nuts will pass over without falling through them. The table is given a shaking motion, either endwise or sidewise. I have found in practice that the end shaking is very suitable for my purpose, and the table may have a slight inclination, so that the nuts and hulls will gradually pass from one end to the other. When they are fed upon the upper end of the table, the shaking motion causes the hulls to turn over and lie with their convex sides uppermost. As soon as the edges of the hulls reach the openings B they will pass through, and the hulls will turn through the openings and fall below. The table might remain stationary and a movable scraper be used to carry the hulls to the openings.

By this simple device the almonds may be thoroughly separated from the exterior hulls with very little labor and attention.

Having thus described my invention, what I claim as new, and desire to secure by Letters Patent, is—

In a device for separating almonds from their hulls, a shaking table having slots formed therein, said slots being curved at their outer and inner sides and having a diameter approximating the size and cross-sectional shape of the almond-hull, substantially as herein described.

In witness whereof I have hereunto set my hand.

JOHN L. HEALD.

Witnesses:
S. H. NOURSE,
H. C. LEE.